March 29, 1932.  O. H. WILLIAMS  1,851,939
CLOSURE FOR CONDUITS
Filed Oct. 30, 1929
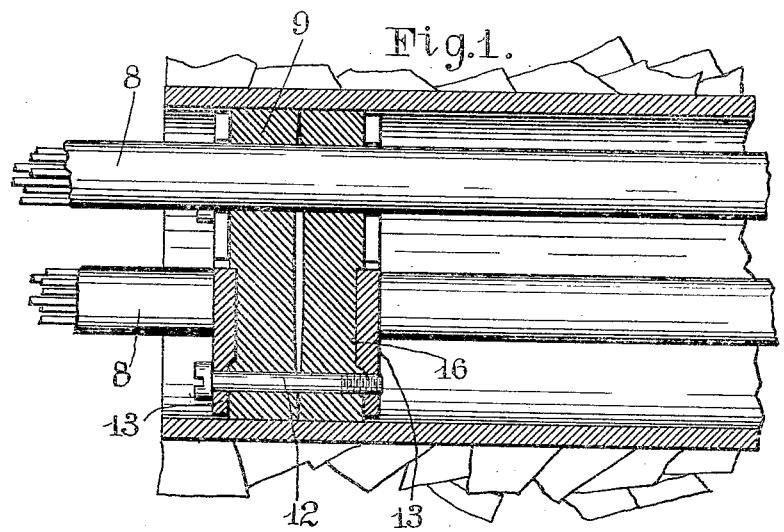
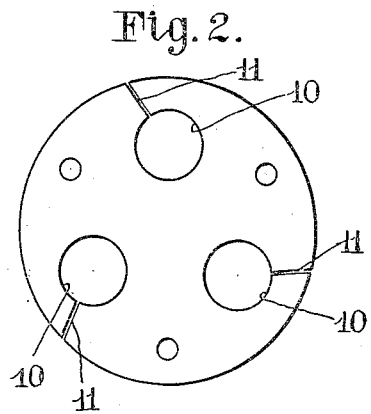
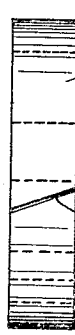
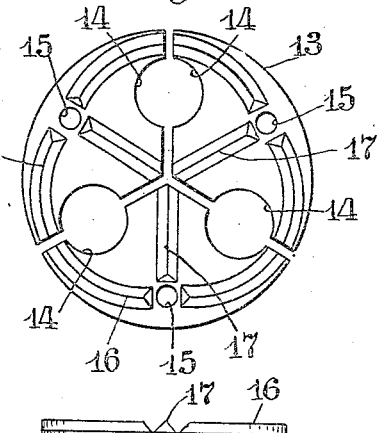
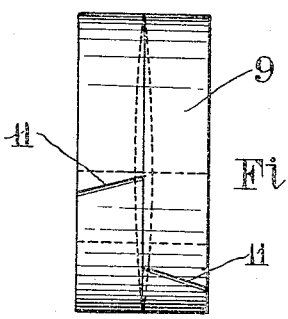
Inventor
ORR H. WILLIAMS
By _Finkel & Finkel_
his Attorneys Patented Mar. 29, 1932

1,851,939

UNITED STATES PATENT OFFICE

ORR H. WILLIAMS, OF COLUMBUS, OHIO

CLOSURE FOR CONDUITS

Application filed October 30, 1929. Serial No. 403,458.

Conduits for leading electric conductors into houses, building and other structures frequently constitute the means for conveying explosive or noxious gases into such structures thereby endangering the health, lives and limbs of the occupants. Means have been proposed for plugging such conduits to prevent the passage of gases with a septum provided with holes for the electric conductors.

The primary object of the present invention is to provide improved means for facilitating the insertion of the electrical conductors in the hole of the septum whereby the conduit may quickly and economically be plugged without cutting the conductor and such gases satisfactorily prevented from passing into the building. The invention can be utilized at any point in a conduit where it is desirable to arrest or prevent the flow of any fluid from the conduit or from one point to another therein.

The invention is embodied in the example herein shown and described, the features of novelty being finally claimed.

In the accompanying drawings—

Figure 1 is a longitudinal section of the terminal of a cable conduit with the invention applied thereto.

Fig. 2 is a side elevation of the compressible septum or plug.

Fig 3 is an edge view of the same.

Fig. 4 is an edge view of a pair of the septums.

Fig. 5 is an elevation of the inner sides of a group of the compressible members.

Fig. 6 is an edge view of the same.

In the views 7 designates a fraction of a conduit at its end said conduit being of the usual material and as it appears terminating at the inner side of the cellar wall of the cellar of a building. 8 designates the usual cables containing the electrical conductors. 9 designates the septum or plug composed of two parts of suitable compressible or resilient material such for example as rubber or a compound thereof adapted to serve as a packing to resist the pressure and passage of fluid.

In the present instance the parts of the septum are each shown as of circular outline of plano-concave form and as provided with three transverse openings 10 equally spaced from each other and from the center of the septum. The two parts of the septum can be made identical with each other. Each part of the septum is cut from the rim inward with a slit 11 to each of the cable receiving openings 10, said slit being preferably at an incline to the plane of the septum so that when pressure is applied to the septum the faces of the slit will be pressed against each other. When the said slits are each offset from a radius passing through the center of the cable receiving opening and the parts of the septum are identical these slits do not coincide longitudinally in the conductor and therefore aid in preventing the passage of gases. The septum is also provided with bolt holes 15a for screw bolts 12 for applying pressure as hereinafter described.

In practice the two parts of the septum will be placed together with the concave faces opposed to each other, hence when pressure is applied to the opposite plane faces the rim will be bulged radially toward the wall of the conduit and therefore prevent the passage of gases.

13 designates the compression members, these being of sector-like form and each provided with arcuate recesses 14 in its straight edges so as to form, when assembled against the plane face of the coincided parts of the septum a circular-like opening to fit around the cables as best shown in Fig. 1. These compression sectors are each provided with a bolt hole 15 for the passage of the aforesaid bolt 12, the holes of the inner compression members being threaded to receive the threaded end of the bolt. If desired the inner faces of the compression members can be made with V-shaped ribs such as at 16 and 17 to bite into the septum.

Among the advantages of this improvement is that the cables can be inserted into their holes laterally by spreading apart the septum at its split portion, and before the sector compression plates are applied to the opposite sides of the septum. This avoids cutting the cables. After the assembled parts are shoved into the conduit the three bolts are further turned to tighten them up and expand the rim of the septum into close contact with the inner wall of the conduit and the walls of the cable openings around the cables. The septum can be easily removed from the conduit by simply loosening the three bolts thereby relaxing the grip of the septum in the conduit.

The forms of the parts can be changed without departing from the gist of the invention as claimed.

What I claim is:

1. Means for plugging a conduit for an electrical or other conductor comprising a compressible septum for the conduit, said septum provided with an opening for the conductor and a through slit transversely of the septum leading from the rim of the septum to the conductor opening thereby permitting the lateral insertion of the conductor to said opening.

2. Means for plugging a conduit for an electrical or other conductor comprising a compressible septum for the conduit, said septum provided with an opening for the conductor and a through slit transversely of the septum and inclined to the plane of the septum leading from the rim of the septum to the conductor opening thereby permitting the lateral insertion of the conductor to said opening.

3. Means for plugging a conduit for an electrical or other conductor comprising a compressible septum for the conduit, said septum provided with an opening for the conductor, and a through slit transversely of the septum leading from the rim of the septum to the conductor receiving opening, and a compression member for the face of the septum composed of a plurality of parts with complementary recesses fitting around the conductor and means for drawing said parts against the septum.

4. Means for plugging a conduit for an electrical or other conductor comprising a compressible septum for the conduit, said septum provided with an opening for the conductor, and a through slit transversely of the septum leading from the rim of the septum to the conductor receiving opening, and a compressible member for the face of the septum composed of a plurality of sector-like parts with complementary recesses fitting around the conductor and means for drawing said parts against the septum.

5. Means for plugging a conduit for an electrical or other conductor comprising a compressible septum for the conduit, said septum provided with an opening for the conductor, and a through slit transversely of and inclined to the plane of the septum and leading from the rim of the septum to the conductor receiving opening, and a compressible member for the face of the septum composed of a plurality of parts with complementary recesses fitting around the conductor and means for drawing said parts against the septum.

6. Means for plugging a conduit for an electrical or other conductor comprising a compressible septum for the conduit, said septum provided with an opening for the conductor, and a through slit transverse the body of the septum and leading from the rim of the septum to the conductor receiving opening, and a compression member for the face of the septum fitting around the conductor and means for drawing said parts against the septum, said compression member provided with projecting ribs to bite into the septum.

7. Means for plugging a conduit for an electrical or other conductor comprising a compressible septum for the conduit, said septum provided with an opening for the conductor, and a through slit transverse the rim of the septum and leading from the rim of the septum to the conductor receiving opening, and a compression member for the face of the septum fitting around the conductor and means for drawing said parts against the septum, said compression member provided with projecting ribs to bite into the septum to expand the material of the septum outwardly against the conduit and inwardly against the cable.

8. Means for plugging a conduit for an electrical or other conductor comprising a septum adapted to expand radially when subjected to compression, and having cable-openings provided with transverse entrance-ways completely dividing the septum from said cable openings to the rim thereof adapted to permit of the entrance of the cable in a direction transverse to the axis of the cable.

9. Means for plugging a conduit for an electrical or other conductor comprising the combination with an expansible septum adapted to fit within a conduit, and having cable-openings completely dividing the septum from the cable openings to the rim of the septum adapted to receive cables in a direction at an angle to the axis of the cables, and compression members adapted when under pressure to cause the septum to expand.

10. Means for plugging a conduit for an electrical or other conductor comprising the combination with a septum adapted to expand radially when subjected to compression, and having cable-openings provided with entrance-ways completely dividing the septum from the cable opening to the rim of the septum adapted to permit of the entrance of the cable in a direction transverse to the axis of the cable, and compression members adapted when under pressure to compress the septum to cause the septum to expand radially.

ORR H. WILLIAMS.